(12) United States Patent  
Kitta et al.

(10) Patent No.: US 7,697,637 B2  
(45) Date of Patent: Apr. 13, 2010

(54) DEMODULATION CIRCUIT AND DEMODULATING METHOD

(75) Inventors: Tatsuaki Kitta, Kawasaki (JP); Takanori Iwamatsu, Kawasaki (JP)

(73) Assignee: Fujitsu Microelectronics Limited, Yokohama (JP)

( * ) Notice: Subject to any disclaimer, the term of this patent is extended or adjusted under 35 U.S.C. 154(b) by 860 days.

(21) Appl. No.: 11/450,465

(22) Filed: Jun. 12, 2006

(65) Prior Publication Data

US 2007/0172002 A1 Jul. 26, 2007

(30) Foreign Application Priority Data

Jan. 20, 2006 (JP) .............................. 2006-013205

(51) Int. Cl. *H04L 27/00* (2006.01)
(52) U.S. Cl. .................. 375/326; 375/324; 375/322; 375/316; 375/219; 455/226.3; 329/304; 329/307; 329/310; 329/306
(58) Field of Classification Search ................ 375/326, 375/324, 322, 316, 219; 455/226.3; 329/304, 329/307, 310, 306
See application file for complete search history.

(56) References Cited

U.S. PATENT DOCUMENTS

2002/0067778 A1* 6/2002 Ahn ........................... 375/326  
2007/0172002 A1* 7/2007 Kitta et al. ................. 375/326

FOREIGN PATENT DOCUMENTS

| JP | 01-160239 A | 6/1989 |
| JP | 05-030098 B2 | 5/1993 |
| JP | 07-250118 A | 9/1995 |
| JP | 2885058 B | 4/1999 |

OTHER PUBLICATIONS

Office Action from Korean Intellectual Property Office dated Jul. 24, 2007 relating to Application No. JP10-2006-00051937.

* cited by examiner

*Primary Examiner*—David C Payne  
*Assistant Examiner*—Zewdu Kassa  
(74) *Attorney, Agent, or Firm*—Arent Fox LLP

(57) ABSTRACT

A demodulation circuit can perform a capturing operation although a frequency error is large. A phase comparator outputs a predetermined value other than 0 as a determination result of a phase error when a phase error of a carrier wave is large and a signal point is located at a predetermined position. A loop filter outputs a negative minimum value to an integrator when an integrated value of a determination result reaches a positive maximum value of a limiter. Thus, when a phase error is large, a value changing from a negative minimum value to a positive maximum value is output from the loop filter, thereby realizing a broad synchronous capture range.

17 Claims, 15 Drawing Sheets

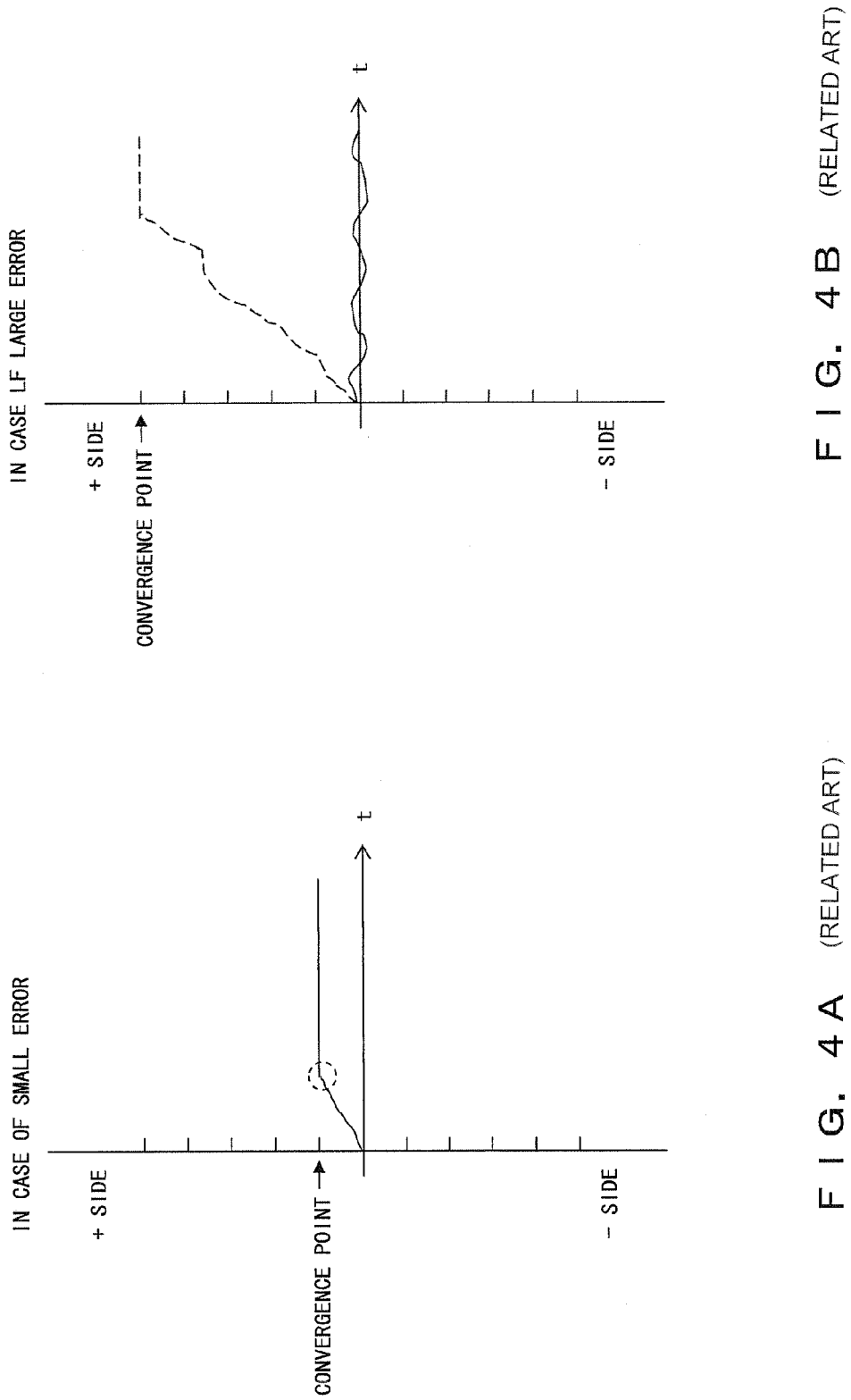

DEMODULATION CIRCUIT AND DEMODULATING METHOD

CROSS-REFERENCE TO RELATED APPLICATIONS

This application is based upon and claims the benefit of priority from the prior Japanese Patent Application No. 2006-013205 filed on Jan. 20, 2006, the entire contents of which are incorporated herein by reference.

BACKGROUND OF THE INVENTION

1. Field of the Invention

The present invention relates to a demodulation circuit and a demodulating method for demodulating a digital-modulated signal.

2. Description of the Related Art

FIG. 1 is a block diagram of a common QPSK demodulation circuit. A QPSK-modulated signal is received by a tuner not shown in the attached drawings, and converted into an intermediate frequency signal IFin. The intermediate frequency signal IFin is converted by an A/D converter 12 into digital data at the timing synchronous with the sampling clock with a predetermined frequency, and further converted by an IQ separator 13 into a baseband signal formed by an I signal and a Q signal.

The IQ separator 13 includes multipliers 13a and 13b for multiplying the output of the A/D converter 12 by a sine wave and a cosine wave having the frequencies equal to the center frequency of the intermediate frequency signal IFin. Low pass filters (LPF) 14a and 14b remove the upper frequency components of the output of the multipliers 13a and 13b, and the output is transmitted to interpolaters 15a and 15b.

Each of the interpolaters 15a and 15b is constituted by an FIR (finite impulse response) filter, a thinning circuit, etc., and the data of the original sampling point (symbol timing) is obtained by interpolation from the received data sampled by the A/D converter 12.

Each of the Root Nyquist filters 16a and 16b is constituted by a low pass filter, and restricts the band of the output signal of the interpolaters 15a and 15b.

A rotor 17 is constituted by a butterfly circuit, etc., advances or delays the phase of a regenerated carrier wave according to the phase difference signal output from a carrier recovery circuit 18, and thereby allows the regenerated carrier wave to be synchronous with the carrier wave of a received signal.

The carrier recovery circuit 18 calculates the phase difference between the signal point on the I and Q phase plane obtained from the I signal and the Q signal and the normal signal point, and outputs the signal in the phase difference decreasing direction to the rotor 17.

A timing recovery circuit 19 calculates the amount of shift of the sampling timing, and output an interpolating tap coefficient to the interpolaters 15a and 15b.

FIG. 2 shows the configuration of a timing recovery loop. The timing recovery loop is constituted by the interpolaters 15a and 15b and the timing recovery circuit 19.

The timing recovery circuit 19 includes a phase comparator 21, a loop filter 22, a numerical controlled oscillator 23, a thinning control unit 24, and a tap coefficient arithmetic unit 25. The interpolaters 15a and 15b includes Fir filters 26a and 26b, and thinning circuits, 27a and 27b.

The phase comparator 21 determines whether the value of a received signal at each sampling timing indicates a monotonous increase, a monotonous decrease, or none of them, and outputs a signal depending on a discrimination result.

The loop filter 22 is a completely secondary loop filter, and includes a multiplier 28 constituting a low pass filter, a multiplier 29 constituting a high pass filter, an adder 30 for adding the output of the multiplier 28 to the output of the integrator 31, a limiter 32, an integrator 31, and an adder 33 for adding the output of the integrator 31 to the output of the multiplier 29. The integrator 31 is constituted by a flip-flop, etc. The coefficient $\alpha$ provided for the multiplier 28 is a gain adjustment coefficient for a low pass filter, and the coefficient $\beta$ provided for the multiplier 29 is a gain adjustment coefficient for a high pass filter.

The numerical controlled oscillator (NCO) 23 includes a flip-flop 34 and an adder 35 for adding the output of the flip-flop 34 to the output of the loop filter 22. The numerical controlled oscillator 23 outputs digital oscillation frequency data according to a signal indicating the shift of the sampling timing output from the loop filter 22.

The tap coefficient arithmetic unit 25 provides a tap coefficient for advance or delay of a phase for the Fir filters 26a and 26b depending on the oscillation frequency data output from the numerical controlled oscillator 23, and outputs the I signal and the Q signal at the original sampling point from the Fir filters 26a and 26b.

The thinning control unit 24 controls the thinning circuits 27a and 27b, and thins data at an unnecessary sampling point in the data at each sampling point output from the Fir filters 26a and 26b.

Next, the operation of the phase comparator 21 of the above-mentioned timing recovery loop is explained by referring to the operation explanation shown in FIG. 3.

FIG. 3 shows the analog waveform of the input of the phase comparator 21. FIG. 3A shows the case in which the value of the input signal of the phase comparator 21 at each of the sampling time t−1, t and t+1 indicates a monotonous increase, and FIG. 3B shows the case of a monotonous decrease.

It is determined whether the values of the input signal indicate either a monotonous increase, based on the values of the input signal of the phase comparator 21 at each of the sampling time t−1, t and t+1, which are d(t−1), d(t), and d (t+1), a monotonous decrease, or any other cases, a predetermined arithmetic operation is performed on the value of an input signal at each sampling time based on the determination result, and outputs the arithmetic result as a phase determination result.

The phase comparator 21 outputs a value obtained by the following equation when the values of the adjacent input signal at the sampling time t−1, t, t+1 indicate a monotonous increase.

$$-2 \times (d(t) + \{d(t+1) - d(t-1)\}/2)$$

The phase comparator 21 outputs a value obtained by the following equation when the values of the input signal at the sampling time t−1, t, t+1 indicate a monotonous decrease.

$$2 \times (d(t) + \{d(t+1) - d(t-1)\}/2)$$

Furthermore, the phase comparator 21 outputs "0" when the values of the input signal at the sampling time t−1, t, t+1 do not indicate a monotonous increase nor a monotonous decrease.

FIG. 4A shows the output of the loop filter 22 when the frequency error between the original sampling point (hereinafter referred to as a symbol timing) and the sampling clock is small. FIG. 4B shows the output of the loop filter 22 when the frequency error against the symbol timing is large.

When the frequency error is small, and the values of the input signal indicate a monotonous increase or a monotonous decrease, the phase comparator 21 outputs a value indicated in the above-mentioned equations, and the integrator 31 of the loop filter 22 integrates the values. As a result, for example, as shown in FIG. 4A, the output of the loop filter 22 increases until it reaches the convergence point of the timing recovery loop, and the capturing operation is completed at the convergence point.

On the other hand, when the frequency error is large, the signal points are distributed at random on the I and Q phase plane. Therefore, the average value of the output of the phase comparator 21 is approximately 0. As a result, the output of the loop filter 22 is fixed to a specific value, for example, as shown in FIG. 4B, close to "0", or is fixed to a specific value.

FIG. 5 shows the value of the limiter 32. When the average value of the output of the phase comparator 21 is approximately 0, the value of the limiter 32 to which an integration result is input is also a constant value.

The characteristic shown by the dotted line in FIG. 4B indicates the desired output characteristic of the loop filter 22 for reaching the convergence point, but the above-mentioned timing recovery circuit 19 cannot realize the capture characteristic as such.

That is, when the timing error is large, the output of the loop filter 22 is fixed to a specific value, and it is hard for the timing recovery circuit 19 to maintain the synchronization of clock timing.

FIG. 6 shows the configuration of the carrier recovery loop for synchronization of the regenerated carrier wave with the carrier wave of a modulated signal.

The carrier recovery loop includes the rotor 17 and the carrier recovery circuit 18. The carrier recovery circuit 18 includes a phase comparator 41, a loop filter 42, a numerical controlled oscillator 43, and a Sin/Cos table 44.

The phase comparator 41 determines the advance or delay of the phase of the signal point on the I and Q phase plane obtained from the I signal and the Q signal to the phase of the normal signal point, and outputs a phase error signal for amendment of the advance or delay of the phase.

The loop filter 42 is a completely secondary loop filter, and includes a multiplier 45 constituting a low pass filter, a multiplier 46 constituting a high pass filter, an adder 47 for adding the output of the multiplier 45 to the output of an integrator 48, a limiter 49, the integrator 48, and an adder 50 for adding the output of the integrator 48 to the output of the multiplier 46. The integrator 48 is constituted by a flip-flop, etc. The coefficient α provided for the multiplier 45 is a gain adjustment coefficient for a low pass filter, and the coefficient β is a gain adjustment coefficient for the high pass filter.

The numerical controlled oscillator 43 includes a flip-flop 51 and an adder 52 for adding the output of the flip-flop 51 to the output of the loop filter 42. The numerical controlled oscillator 43 outputs oscillation frequency data for amendment of the frequency error (phase error) of a carrier.

The Sin/Cos table 44 is a table for generation of a sine wave and a cosine wave corresponding to the oscillation frequency data output from the numerical controlled oscillator 43.

The rotor 17 includes multipliers 53 and 54 for multiplying an I signal by the sine wave and the cosine wave output from the Sin/Cos table 44, multipliers 55 and 56 for multiplying a Q signal by the sine wave and the cosine wave, an adder 57 for adding the output of the multiplier 53 to the output of the multiplier 56, and an adder 58 for adding the output of the multiplier 54 to the output of the multiplier 55. (The output of the multiplier 54 is multiplied by "−1" and input to the adder 58.)

The rotor 17 multiplies the I signal and the Q signal by the sine wave and the cosine wave output from the Sin/Cos table 44 to rotate the signal point by the primary transform, and outputs the I signal and the Q signal at a desired sampling point.

FIG. 7 shows a signal point of the I and Q phase plane (constellation point). The point indicated by the black dot shown in FIG. 7 is a normal signal point, the point indicated by a white dot is a signal point indicating a minus phase difference, and the point indicated by a dot with diagonal lines is a signal point having a plus phase difference. The counterclockwise rotation is a positive rotation and the clockwise rotation is a negative rotation.

The phase comparator 41 outputs a minus error signal when the position of the signal point on the I and Q phase plane determined according to the I signal and the Q signal output from the rotor 17 is detected in a predetermined range of the plus side relative to the position of the normal signal point, and outputs a plus error signal when it is detected in a predetermined range on the plus side on the I and Q phase plane. The phase comparator 41 outputs "0" when the position of the signal point depending on the I signal and the Q signal is detected in the position of the normal signal point.

In the carrier recovery loop, when the frequency error of a carrier is large, a signal point is distributed at random on the I and Q phase plane. Therefore, the average value of the output of the phase comparator 41 is approximately 0. Therefore, there has been the problem that, like the above-mentioned timing recovery loop, the output of the loop filter 42 is fixed to a specific value, and no carrier can be captured.

The patent document 1 describes providing a limiter for outputting an initialization value at the minimum level when the input value becomes larger than the limiter value in the feedback route to prevent pseudo synchronization.

The patent document 2 describes integrating a phase error signal, detecting synchronization by comparing an integrated value with a threshold, and stopping frequency sweep when synchronization is detected.

[Patent Document 1] Japanese Patent No. 2885058
[Patent Document 2] Japanese Patent Publication No. H5-30098

SUMMARY OF THE INVENTION

The present invention aims at providing a demodulation circuit capable of performing a capturing process although a frequency error is large.

The present invention is a demodulation circuit for demodulating a received signal, and includes: a carrier wave regeneration loop for performing control such that a phase error for a carrier wave can be minimized in tracing the carrier wave; a phase error determination circuit, which is included in the carrier wave regeneration loop, for determining the advance or delay of a phase relative to the carrier wave, and determining as a phase advance when a phase advance or delay cannot be discriminated; and a loop filter, which is included in the carrier wave regeneration loop, for integrating the determination result of a phase advance or delay, and shifting the integrated value to the maximum integrated value on the phase-delay determined side when the integrated value reaches the maximum integrated value on the phase-advance determined side.

According to the present invention, when the phase advance or delay of a carrier wave cannot be discriminated, the integrated value of a loop filter can reach the maximum integrated value on the phase-advance determined side by determining as a phase advance. When the integrated value of the loop filter reaches the maximum integrated value on the phase-advance determined side, the integrated value can be shifted to the maximum integrated value on the phase-delay determined side. Thus, the capture range of the carrier wave regeneration loop can be broad, and the capture time can be shortened.

Another demodulation circuit according to the present invention demodulates a received signal, and includes: a carrier wave regeneration loop for performing control such that a phase error for a carrier wave can be minimized in tracing the carrier wave; a phase error determination circuit, which is included in the carrier wave regeneration loop, for determining the advance or delay of a phase relative to the carrier wave, and determining as a phase delay when a phase advance or delay cannot be discriminated; and a loop filter, which is included in the carrier wave regeneration loop, for integrating the determination result of a phase advance or delay, and shifting the integrated value to the maximum integrated value on the phase-advance determined side when the integrated value reaches the maximum integrated value on the phase-delay determined side.

According to the present invention, when the phase advance or delay of a carrier wave cannot be discriminated, the integrated value of a loop filter can reach the maximum integrated value on the phase-delay determined side by determining such status as a phase delay. When the integrated value of the loop filter reaches the maximum integrated value on the phase-delay determined side, the integrated value can be shifted to the maximum integrated value on the phase-advance determined side. Thus, the capture range of the carrier wave regeneration loop can be broad, and the capture time can be shortened.

In the demodulation circuit according to the present invention, the phase error determination circuit outputs a predetermined value other than 0 when a signal point on the I and Q phase plane of the carrier wave is on a predetermined line or in a predetermined area.

With the above-mentioned configuration, although the signal points of a carrier wave exist at random on the I and Q phase plane, a predetermined value indicating a phase determination result other than 0 is output relative to a signal point on a predetermined line or in a predetermined area, thereby allowing the integrated value of the loop filter to reach the maximum integrated value on the phase-advance determined side or the maximum integrated value on the phase-delay determined side.

In the demodulation circuit according to the present invention, the loop filter includes a limiter for outputting a maximum integrated value on the phase-delay determined side as the integrated value when the integrated value of the determination result of the phase error determination circuit reaches the maximum integrated value on the phase-advance determined side.

With the configuration, when a phase error is large, the maximum integrated value on the phase-delay determined side through the maximum integrated value on the phase-advance determined side can be output from the loop filter, thereby performing a synchronous capturing operation in a broad capture range.

In the demodulation circuit according to the present invention, the loop filter includes a limiter for outputting a maximum integrated value on the phase-advance determined side as the integrated value when the integrated value of the determination result of the phase error determination circuit reaches the maximum integrated value on the phase-delay determined side.

With the configuration, when a phase error is large, the maximum integrated value on the phase-advance determined side through the maximum integrated value on the phase-delay determined side can be output from the loop filter, thereby performing a synchronous capturing operation in a broad capture range.

Another demodulation circuit according to the present invention is a demodulation circuit for demodulating a received signal, and includes: a clock regeneration loop for performing control such that a phase error for the symbol timing can be minimized in tracing a clock to the symbol timing of a received signal; a phase error determination circuit, which is included in the clock regeneration loop, for determining the advance or delay of a phase relative to the clock, and determining as a phase advance when a phase advance or delay cannot be discriminated; and a loop filter, which is included in the clock regeneration loop, for integrating the determination result of a phase advance or delay, and shifting the integrated value to the maximum integrated value on the phase-delay determined side when the integrated value reaches the maximum integrated value on the phase-advance determined side.

According to the present invention, when the phase advance or delay of a clock cannot be discriminated, the integrated value of a loop filter can reach the maximum integrated value on the phase-advance determined side by determining such status as a phase advance. When the integrated value reaches the maximum integrated value on the phase-advance determined side, the integrated value can be shifted to the maximum integrated value on the phase-delay determined side. Thus, the capture range of the clock regeneration loop can be broad, and the capture time can be shortened.

Another demodulation circuit according to the present invention is a demodulation circuit for demodulating a received signal, and includes: a clock regeneration loop for performing control such that a phase error for the symbol timing can be minimized in tracing a clock by the symbol timing of a received signal; a phase error determination circuit, which is included in the clock regeneration loop, for determining the advance or delay of a phase relative to the symbol timing, and determining as a phase delay when a phase advance or delay cannot be discriminated; and a loop filter, which is included in the clock regeneration loop, for integrating the determination result of a phase advance or delay, and shifting the integrated value to the maximum integrated value on the phase-advance determined side when the integrated value reaches the maximum integrated value on the phase-delay determined side.

According to the present invention, when the phase advance or delay of a symbol timing cannot be discriminated, the integrated value of a loop filter can reach the maximum integrated value on the phase-delay determined side. When the integrated value reaches the maximum integrated value on the phase-delay determined side, the integrated value of the loop filter can be shifted to the maximum integrated value on the phase-advance determined side. Thus, the capture range of the clock regeneration loop can be broad, and the capture time can be shortened.

In the demodulation circuit according to the present invention, when the carrier wave is sampled using a predetermined sampling clock, the phase error determination circuit determines whether the value of each sampling point indicates a monotonous increase or a monotonous decrease, and outputs a predetermined value other than 0 when the value does not indicate a monotonous increase or a monotonous decrease.

With the configuration, when sampling timing of a carrier wave is shifted from a desired sampling timing, it can be adjusted to be synchronous with the desired timing.

In the demodulation circuit according to the present invention, the loop filter includes a limiter for outputting the maximum integrated value on the phase-delay determined side as the integrated value when the integrated value of the determination result of the phase error determination circuit reaches the maximum integrated value on the phase-advance determined side.

With the configuration, even when sampling timing is shifted, the maximum integrated value on the phase-delay determined side through the maximum integrated value on the phase-advance determined side can be output from the loop filter, thereby performing a synchronous capturing operation in a broad capture range.

In the demodulation circuit according to the present invention, the loop filter includes a limiter for outputting the maximum integrated value on the phase-advance determined side as the integrated value when the integrated value of the determination result of the phase error determination circuit reaches the maximum integrated value on the phase-delay determined side.

With the configuration, even when sampling timing is shifted, the maximum integrated value on the phase-advance determined side through the maximum integrated value on the phase-delay determined side can be output from the loop filter, thereby performing a synchronous capturing operation in a broad capture range.

BRIEF DESCRIPTION OF THE DRAWINGS

FIGS. 4A and 4B show the output of the loop filter;

DETAILED DESCRIPTION OF THE PREFERRED EMBODIMENTS

Figure 1:
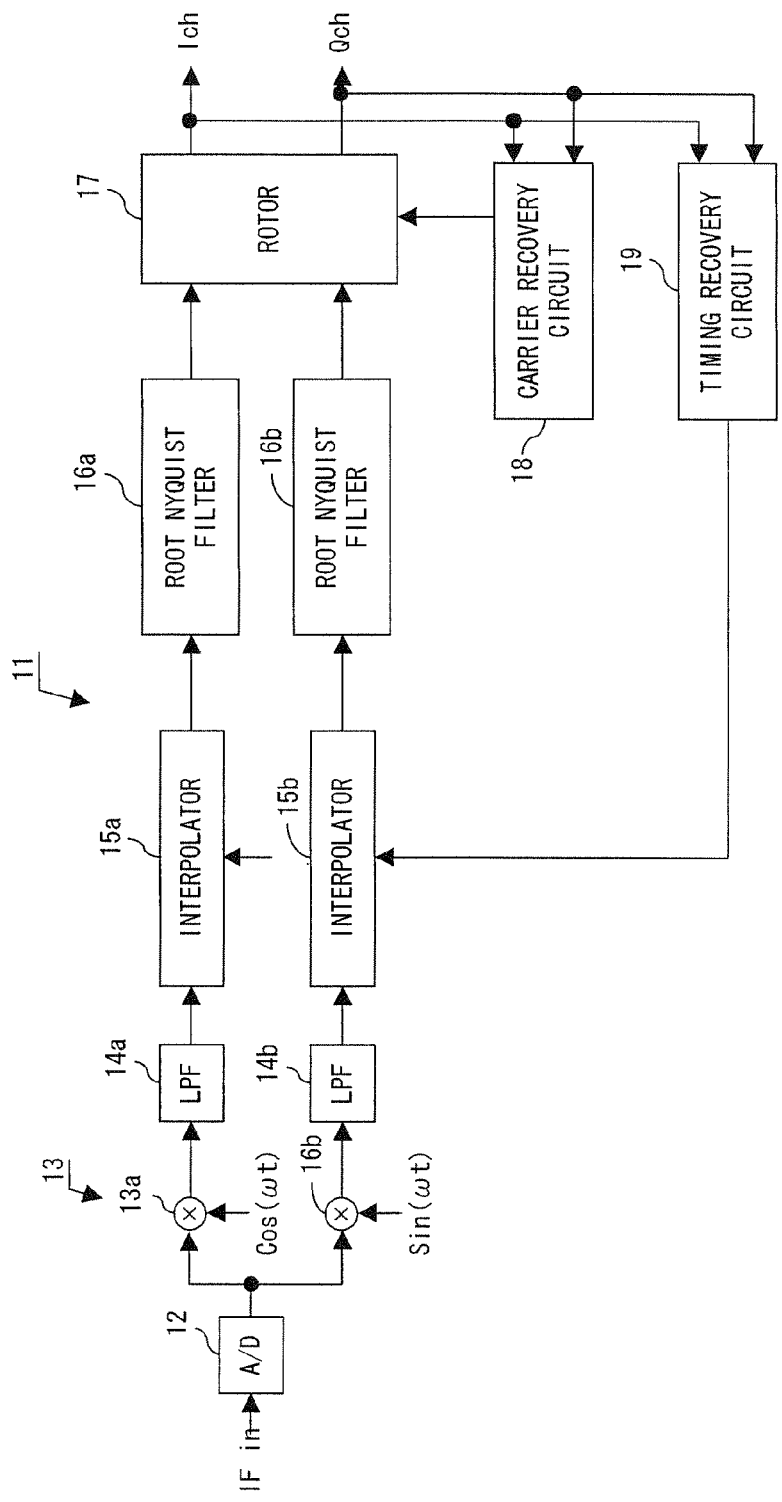
FIG. 1 is a block diagram of the QPSK demodulation circuit.

The embodiments of the present invention are described below by referring to the attached drawings. The digital demodulation circuit according to an embodiment of the present invention basically has the same configuration as the QPSK circuit shown in FIG. 1.

Figure 6:
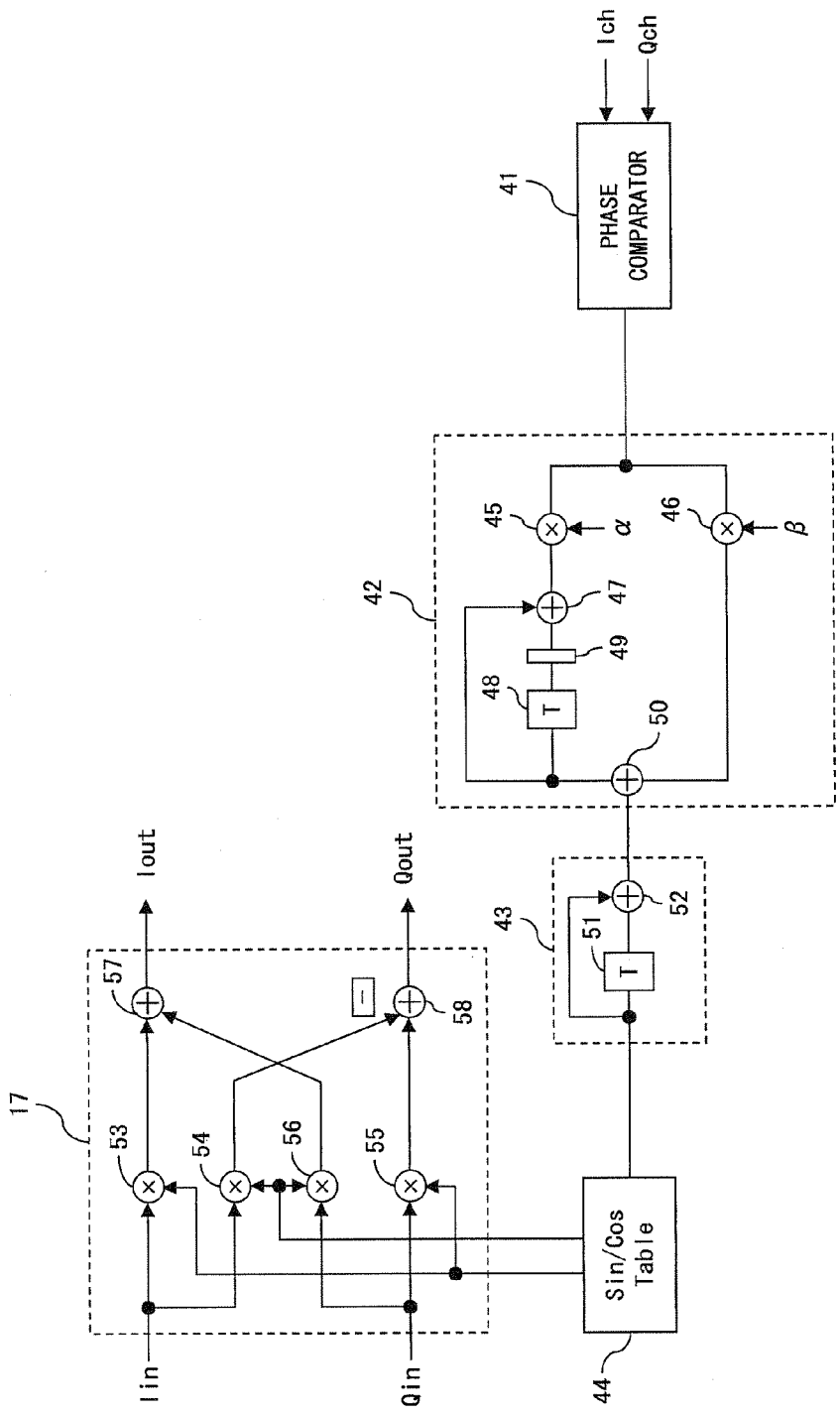
FIG. 6 shows the configuration of a carrier recovery loop.
Figure 7:
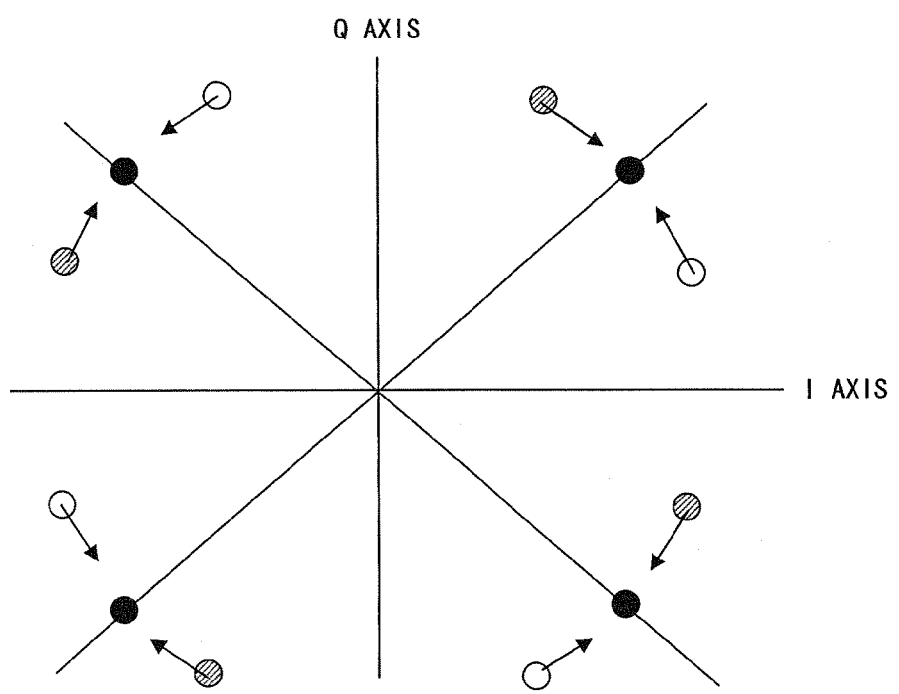
FIG. 7 shows signal points of an I and Q phase plane.
Figure 8:
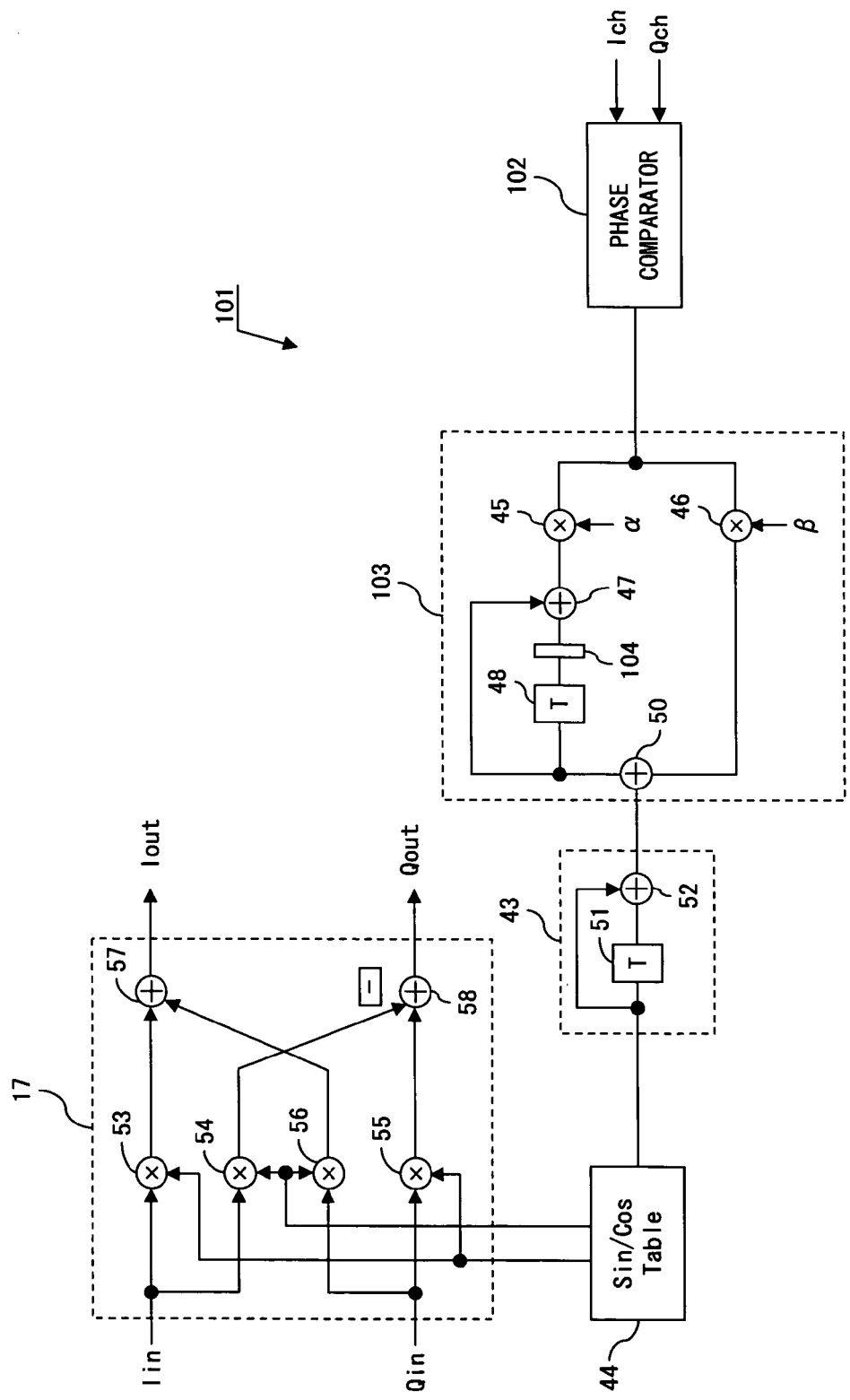
FIG. 8 shows the configuration of the carrier recovery loop according to the first embodiment of the present invention.

FIG. 8 shows the configuration of the carrier recovery loop of the digital demodulation circuit according to the first embodiment of the present invention. In FIG. 8, the circuit block that is the same as the carrier recovery loop shown in FIG. 6 is assigned the same reference numeral, and the detailed explanation is omitted here. In the circuit shown in FIG. 8, the differences from the circuit shown in FIG. 6 are the configurations of a phase comparator 102 and a loop filter 103 in a carrier recovery circuit 101.

Figure 9:
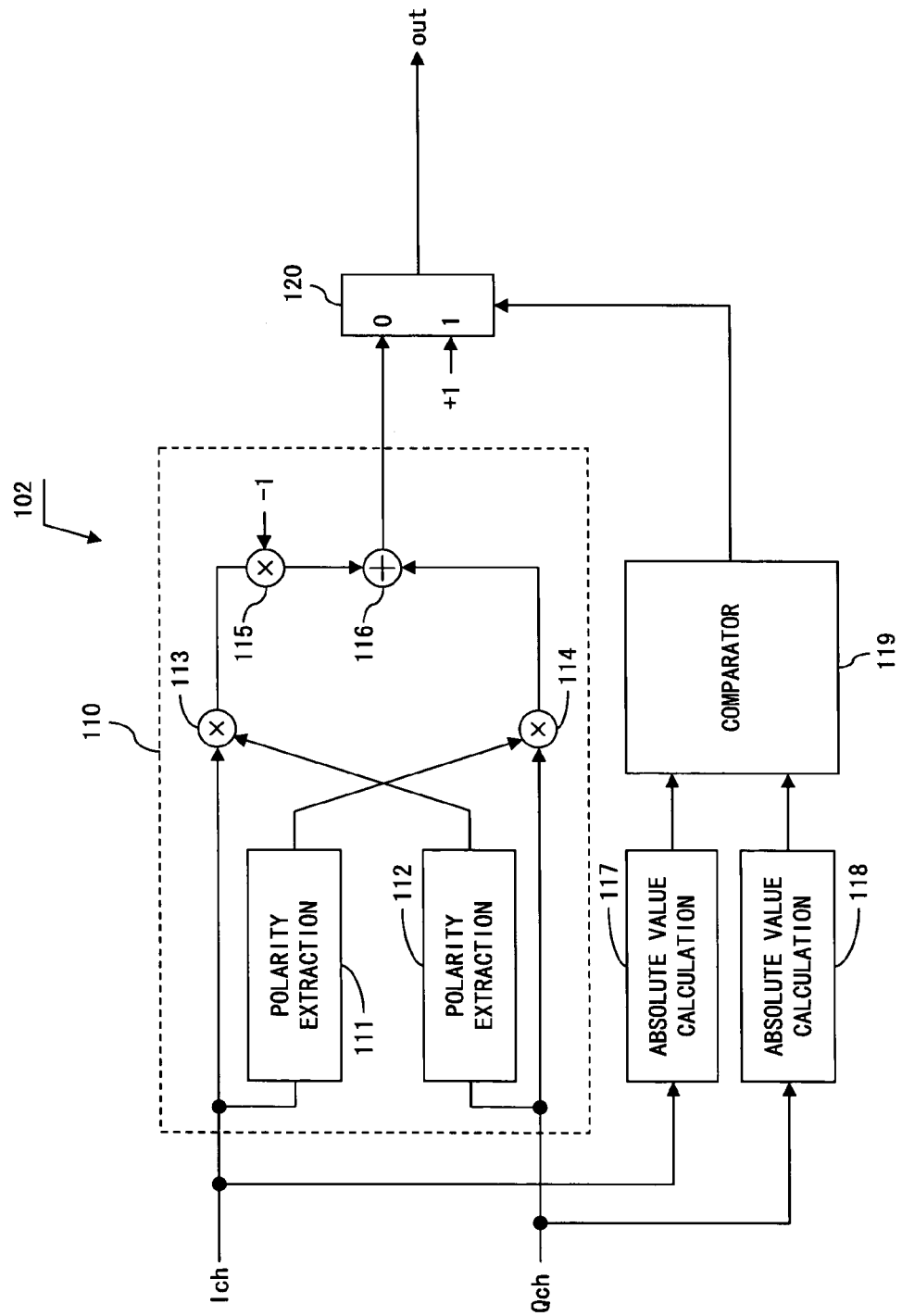
FIG. 9 shows the configuration of a phase comparator according to the first embodiment of the present invention.

FIG. 9 shows the configuration of the phase comparator 102 in the carrier recovery circuit 101.

The phase comparator (corresponding to the phase error determination circuit) 102 comprises a polarity extraction circuit 111 for extracting the polarity of an I channel signal (Ich, hereinafter referred to as an I signal), a polarity extraction circuit 112 for extracting the polarity of a Q channel signal (Qch, hereinafter referred to as a Q signal), a multiplier 113 for multiplying the I signal by the polarity extracted by the polarity extraction circuit 112, a multiplier 114 for multiplying the Q signal by the polarity extracted by the polarity extraction circuit 111, a multiplier 115 for multiplying the output of the multiplier 113 by −1, and an adder 116 for adding the output of the multiplier 115 to the output of the multiplier 114.

The polarity extraction circuits 111 and 112 output "+1" when the input signal (I signal or Q signal) is positive, and output "−1" when it is negative.

A circuit block 110 formed by the polarity extraction circuits 111, 112, etc. determines whether the signal point (constellation point) of a received signal is positioned in an area of the plus side (counterclockwise on the I and Q plane) relative to the normal signal point or in the area of the minus side. When the signal point of the received signal is positioned on the plus side, it outputs "a certain positive value", and when signal point is positioned on the minus side, it outputs "a certain negative value".

The phase comparator 102 further comprises an absolute value calculation circuit 117 for calculating an absolute value of an I signal, an absolute value calculation circuit 118 for calculating an absolute value of a Q signal, a comparator 119 for comparing the output of the absolute value calculation circuit 117 with the output of the absolute value calculation circuit 118, outputting "1" when they match, and outputting "0" when they do not match, and a selector (selection circuit) 120 for selecting either the output of the adder 116 or "+1" based on the comparison result of the comparator 119 and outputting the result.

When the frequency error of a carrier is large, the signal points corresponding to the I signal and the Q signal of each sampling point of a received signal are distributed at random on the I and Q plane. Therefore, there are some signal points on a predetermined line on the I and Q plane, for example, a line of Q=I or Q=−I. In the present embodiment, when the signal point of a received signal is positioned on the line of Q=I or Q=−I, a control signal for the selector 120 selecting and outputting "+1" is output from the comparator 119. That is, when the frequency error of a carrier is large, the phase advance or delay cannot be discriminated, and a signal point is on a specific line, the phase comparator 102 determines a phase advance, and outputs "1" as a phase error signal.

Therefore, although the frequency error of a carrier is large, an average value of the phase error signals output from the phase comparator 102 is not "0", but a value of "1" or larger. Since a phase error signal output from the phase comparator 102 is integrated by the loop filter 103, the output of the phase comparator 102 increases (or decreases) unless the average value of the output of the phase comparator 102 is "0". As a result, the integrated value finally reaches the maximum integrated value on the phase-advance determined side (or phase-delay determined side).

When the phase advance or delay of the regeneration carrier cannot be determined because the frequency error of a carrier is large, the determination result of phase advance or delay output by the phase comparator 102 is not limited to "1", but any positive or negative value other than 0 can be used.

When the phase error is large, the determination condition when the phase comparator 102 outputs a predetermined value (for example, 1) is not limited to the case where the signal point is positioned on the line of Q=1 or Q=−1, but a line tilted on the I and Q phase plane at any angles can be used. Otherwise, when a phase error is large, it can be determined whether or not the signal point is positioned in a predetermined area, and a predetermined value other than 0, for example, "1", "−1", etc. can be output only when the signal point is positioned in a predetermined area. Thus, although a phase error is large, the average value of the output of the phase comparator 102 is not 0. Therefore, the integrated value of the loop filter 103 can be prevented from being fixed to a specific value.

Figure 10:
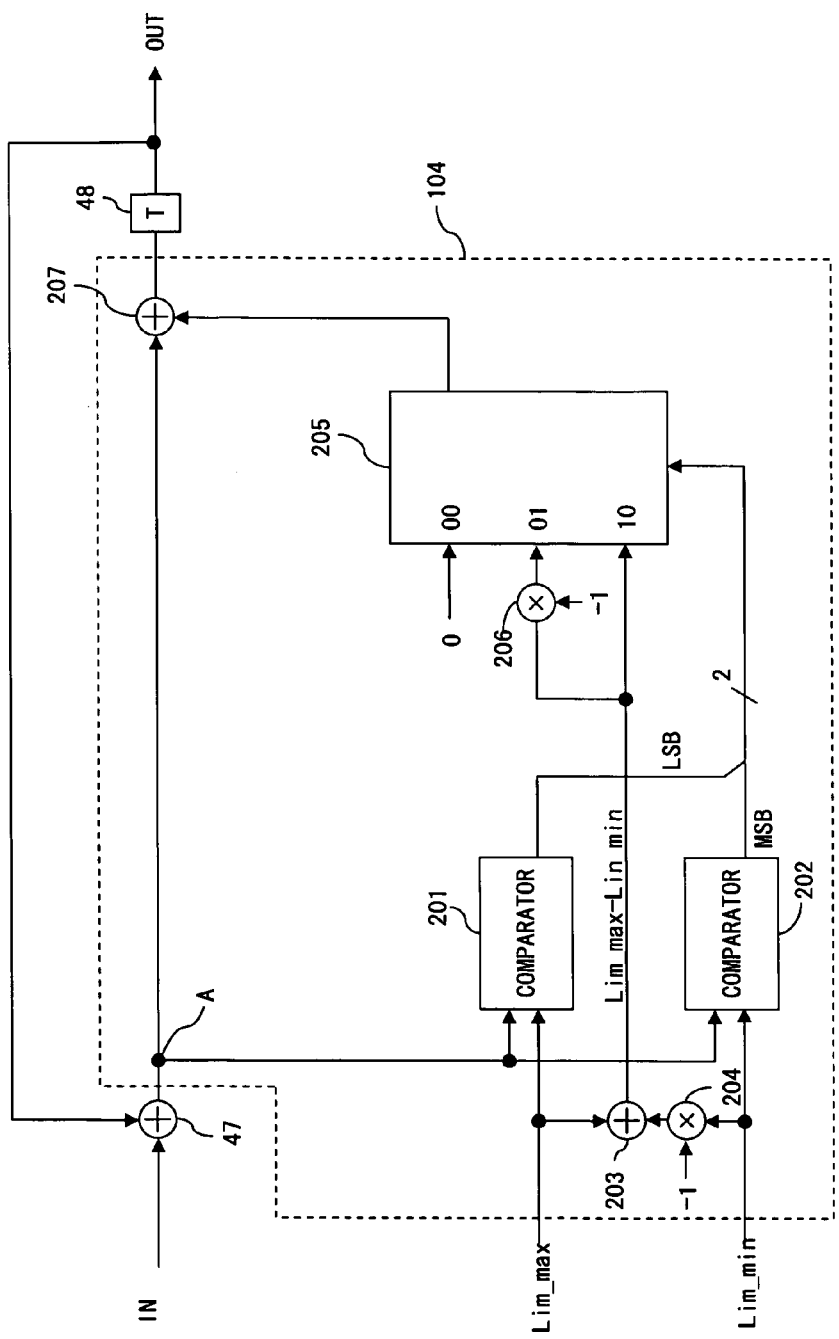
FIG. 10 shows the configuration of a limiter.

The configuration of a limiter 104 shown in FIG. 8 is explained by referring to FIG. 10. FIG. 10 also shows the adder 47 and the integrator 48 of the loop filter 103.

The limiter 104 comprises: a comparator 201 for comparing the output of the adder 47 of the loop filter 103 with the positive maximum value Lim_max (corresponding to the maximum integrated value on the phase-advance determined side; a comparator 202 for comparing the output of the adder 47 with the negative minimum value Lim_min (corresponding to the maximum integrated value on the phase-delay determined side); a multiplier 204 for multiplying the negative minimum value Lim_min by "−1"; an adder 203 for adding the positive maximum value Lim_max to the output of the multiplier 204; a selector 205; a multiplier 206 for multiplying the output of the adder 203 by "−1" and output the result to the selector 205; and an adder 207.

The comparator 201 compares the output of the adder 47 (hereinafter referred to as the value of the point A) obtained by adding the integrated value of the integrator 48 to the input IN (output of the multiplier 45 shown in FIG. 8) with the positive maximum value Lim_max and outputs "1" when the value of the point A reaches the positive maximum value Lim_max, otherwise outputs "0" to the control terminal of the selector 205.

The comparator 202 compares the value of the point A with the negative minimum value Lim_min, outputs "1" when the value of the point A reaches the negative minimum value Lim_min, and otherwise outputs "0". The adder 203 outputs to the selector 205 and the multiplier 206 the value Lim_max-Lim_min obtained by subtracting the negative minimum value Lim_min from the positive maximum value Lim_max. The comparison result "0" or "1" of the comparator 201 is provided for the control terminal of the selector 205 as the data of the least significant bit LSB of the 2-bit control signal, and the value of "0" of "1" as a comparison result of the comparator 202 is provided for the control signal of the selector 205 as the data of the most significant bit MSB of the 2-bit control signal.

The selector 205 selects either of the three input signals "0", "−(Lim_max-Lim_min)" (output of the multiplier 206), or "Lim_max-Lim_min" (output of the adder 203) based on the value (00, 01, 10) of the 2-bit control signal to be provided for the control terminal, and outputs the selected value. Practically, as shown by the selector 205 shown in FIG. 10, when the control signal is "00", it outputs "0". When the control signal is "01", it outputs "−(Lim_max-Lim_min)". When the control signal is "10", it selects "Lim_max-Lim_min" and outputs the selected value.

The output of the selector 205 is added by the adder 207 to the value of the point A, and output to the integrator 48.

Therefore, the limiter 104 outputs the value of the point A as is when the value of the point A is smaller than the positive maximum value Lim_max, and larger than the negative minimum value Lim_min.

When the value of the point A reaches the positive maximum value Lim_max, the sum of the value of the point A and "−(Lim_max-Lim_min)" output at the time from the selector 205 is output to the integrator 48. Thus, the value of the integrator 48 changes from the positive maximum value Lim_max to the negative minimum value Lim_min.

When the value of the point A reaches the negative minimum value Lim_min, the sum of the value of the point A and the "Lim_max-Lim_min" output at the time from the selector 205 is output to the integrator 48. Thus, the value of the integrator 48 changes from the negative minimum value Lim_min to the positive maximum value Lim_max.

Figure 11:
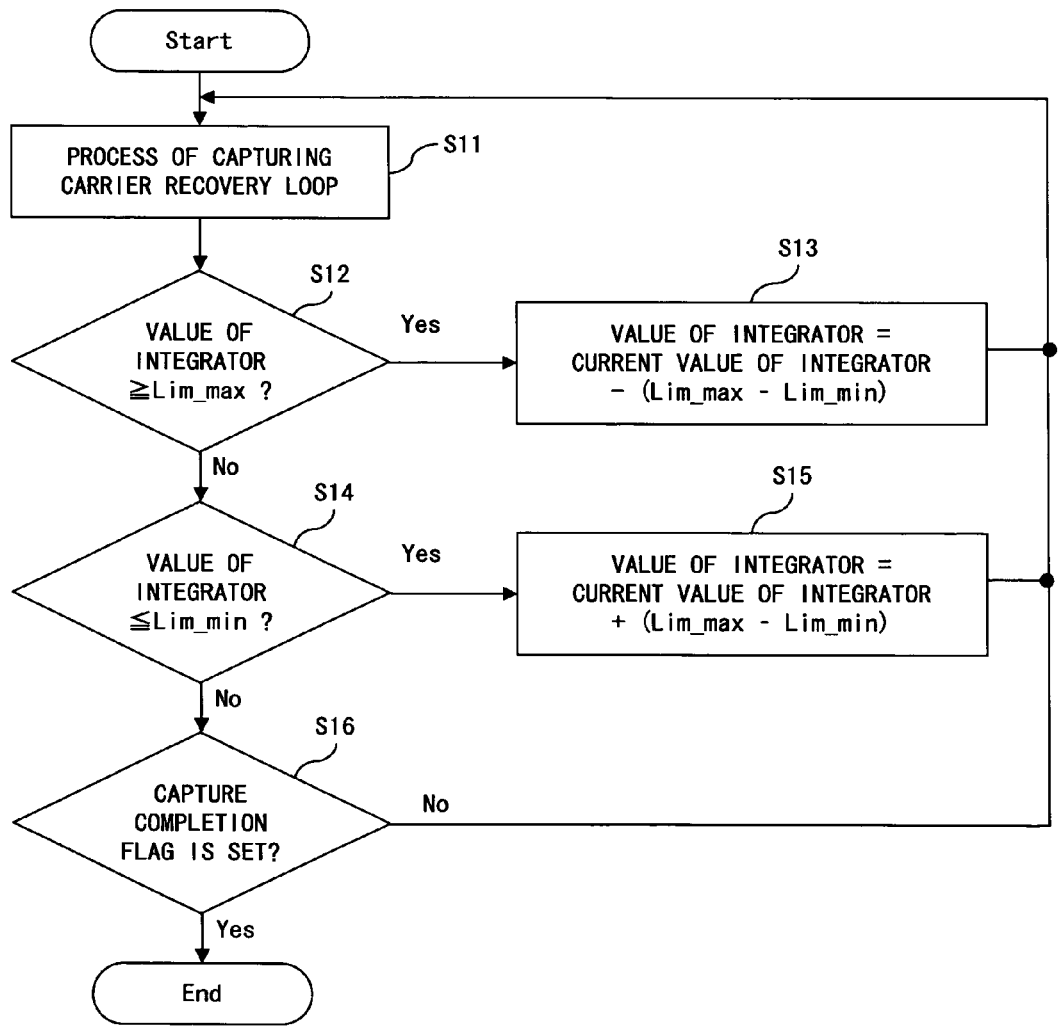
FIG. 11 is a flowchart for explanation of the capturing operation.

The operation performed during the synchronous capture of the carrier recovery loop is explained by referring to the flowchart shown in FIG. 11. The synchronous capturing operation of the timing recovery loop according to the second embodiment of the present invention is the same as the process shown in FIG. 11.

The carrier recovery loop performs the synchronous capturing process of the carrier of a received signal (S11 shown in FIG. 11).

The limiter 104 determines whether or not the output of the adder 30 (hereinafter referred to as a value of an integrator) is equal to or larger than the positive maximum value Lim_max (S12). The process corresponds to the function of the comparator 201 of the limiter 104.

When the value of the integrator is equal to or larger than the positive maximum value Lim_max (YES in S12), control is passed to step S13, "−(Lim_max-Lim_min)" is added to the current value of the integrator, and the sum is output to the integrator 48. The process corresponds to the function of the selector 205 of the limiter 104.

When the value of the integrator is smaller than the positive maximum value Lim_max (NO in S12), control is passed to step S14, and it is determined whether or not the value of the integrator is equal to or smaller than the negative minimum value Lim_min. The process corresponds to the function of the comparator 202 of the limiter 104.

When the value of the integrator is equal to or smaller than the negative minimum value Lim_min (YES in S14), control is passed to step S15, and "Lim_max-Lim_min" is added to the current value of the integrator, and the sum is output to the integrator 48. The process corresponds to the function of the selector 205 of the limiter 104.

When the value of the integrator is larger than the negative minimum value Lim_min (NO in S14), control is passed to step S16, and it is determined whether or not a capture completion flag is set. When the capturing operation is not completed and the capture completion flag is not set, control is returned to step S11, and the synchronous capturing process is continued. When the capture completion flag is set, the process terminates.

The positive maximum value Lim_max and the negative minimum value Lim_min are not limited to the maximum value or the minimum value of a limiter, but a desired value can be set.

Figure 12A:
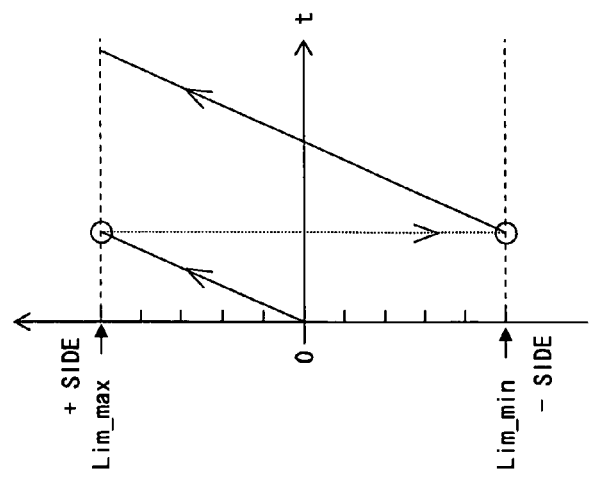
FIGS. 12A and 12B show a change in value of an integrator.
Figure 12B:
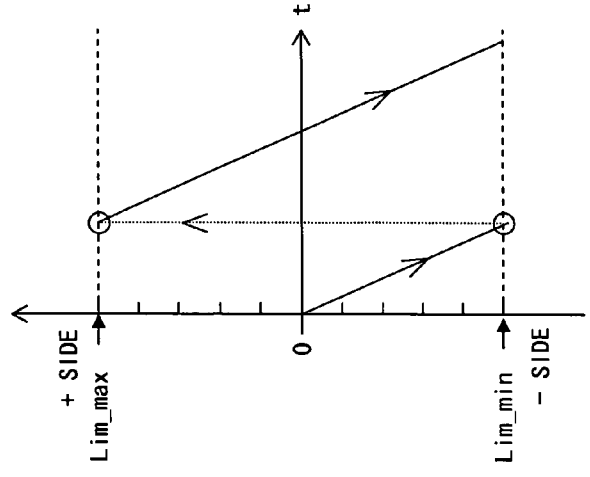

FIGS. 12A and 12B show the change of the value of the integrator 48. FIG. 12A shows the change of the value of the integrator 48 when "+1" is output from the phase comparator 102 when the frequency error of a carrier is large, and FIG. 12B shows the change of the value of the integrator 48 when "−1" is output from the phase comparator 102 when the frequency error of a carrier is large. The horizontal axis shown in FIGS. 12A and 12B indicates time, and the vertical axis indicates the value of the integrator 48.

When "+1" is output from the phase comparator 102 when the frequency error of a carrier is large as shown in FIG. 12A, "1" is output from the phase comparator 102 in an asynchronous state. Therefore, the value of the integrator 48 increases toward the positive maximum value Lim_max. When the value of the integrator 48 reaches the positive maximum value Lim_max, the limiter 104 sets the negative minimum value Lim_min in the integrator 48 as described. Afterwards, when the signal point of the received signal satisfies a predetermined condition until the synchronization of a carrier is attained (for example, the condition of Q=I or Q=−I is satisfied), "1" is output from the phase comparator 102. Therefore, the value of the integrator 48 increases toward the positive maximum value Lim_max. Thus, a carrier can be captured in a broad capture range by changing the integrated value of the limiter 49, that is, the output of the loop filter 103 from the negative minimum value Lim_min to the positive maximum value Lim_max.

If "−1" is to be output from the phase comparator 102 when the frequency error of a carrier is large as shown in FIG. 12B, then the value of the integrator 48 decreases toward the negative minimum value Lim_min by sequentially integrating the value of "−1" output from the phase comparator 102. When the value of the integrator 48 reaches the negative minimum value Lim_min, the limiter 104 sets the positive maximum value Lim_max in the integrator 48. Then, each time the signal point of a received signal satisfies a predetermined condition until synchronization can be attained, "−1" is output from the phase comparator 102. Therefore, the value of the integrator 48 decreases toward the negative minimum value Lim_min. Thus, the output of the loop filter 103 is changed from the positive maximum value Lim_max to the negative minimum value Lim_min, thereby capturing the carrier in a broad capture range.

Figure 13B:
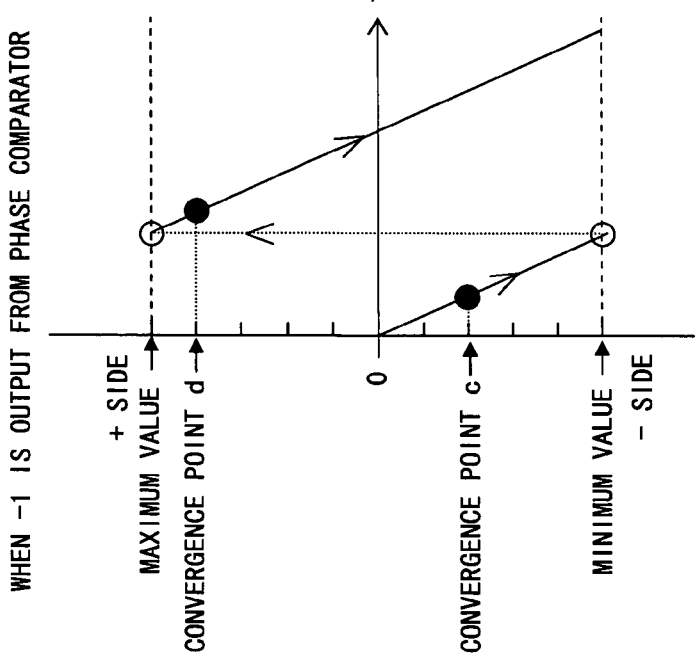
FIGS. 13A and 13B are explanatory views of the capturing operation.
Figure 13A:
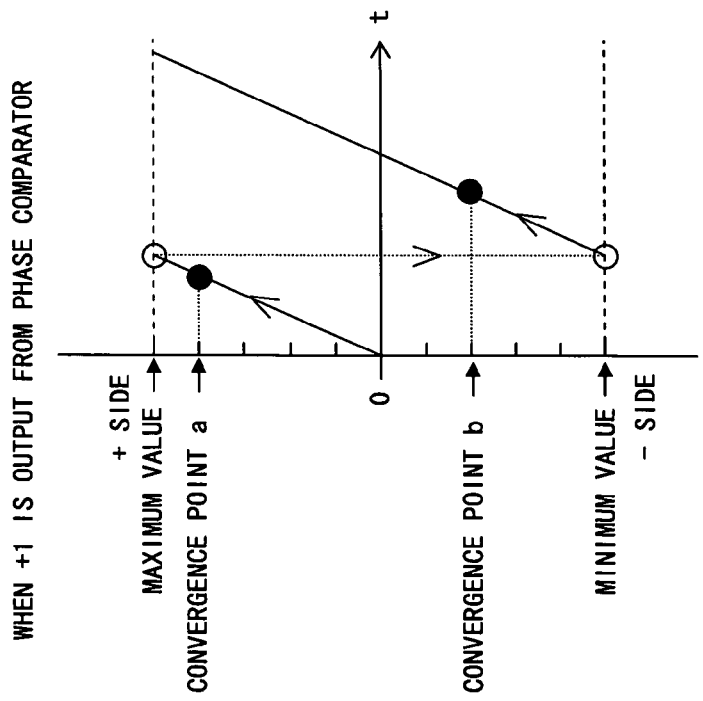

Next, FIGS. 13A and 13B is an explanatory view of the capturing operation of a carrier. FIG. 13A shows a capturing operation performed when the phase comparator 102 outputs "+1" if the frequency error is large. FIG. 13B shows the capturing operation performed when the phase comparator 102 outputs "−1" if the frequency error is large.

When the phase comparator 102 output "+1" as shown in FIG. 13A, the value of the integrator 48 increases by the value of "1" output from the phase comparator 102.

When the convergence point is located at the point a shown in FIG. 13A, the capturing process is completed when the value of the integrator 48 reaches the value (indicated by the black dot shown in FIG. 13A) of the convergence point a.

When the convergence point is located at the point b shown in FIG. 13A, the value of the integrator 48 gradually increases by the value of "1" output from the phase comparator 102 in an asynchronous state. When the value of the integrator 48 reaches the positive maximum value Lim_max, the limiter 104 output the negative minimum value Lim_min to the integrator 48. Then, each time the signal point of a received signal satisfies a predetermined condition until synchronization is attained (for example, when the condition of Q=1 or Q=−1 is satisfied), the phase comparator 102 outputs "+1", and the value of the integrator 48 gradually increases. When the value of the integrator 48 reaches the value (indicated by the black dot shown in FIG. 13A) of the convergence point b, the capturing operation is completed. In the case above, the synchronous capture range (capture range) spans the negative minimum value through the positive maximum value. Therefore, the capture range is broad.

Next, when the phase comparator 102 output "−1" as shown in FIG. 13B, the value of the integrator 48 decreases by the value of "−1" output from the phase comparator 102. When the convergence point is located at the point c shown in FIG. 13B, the capturing operation terminates when the value of the integrator 48 reaches the value (indicated by the black dot shown in FIG. 13B) of the point c of the convergence point.

When the convergence point is located at the point d shown in FIG. 13B, the value of the integrator 48 gradually decreases by the value of "−1" output from the phase comparator 102 in the asynchronous state. When the value of the integrator 48 reaches the negative minimum value Lim_min, the limiter 104 outputs the positive maximum value Lim_max to the integrator 48. Then, until the synchronization can be attained, the phase comparator 102 outputs "−1" each time the signal point of a received signal satisfies a predetermined condition (for example, when the condition of Q=1 or Q=−1 is satisfied), the value of the integrator 48 gradually decreases. When it reaches the value at the point d of the convergence point (indicated by the black dot shown in FIG. 13B), the capturing operation terminates. In the case above, the capture range spans the positive maximum value through the negative minimum value. Therefore, the capture range is broad.

In the first embodiment, the phase comparator 102 outputs a predetermined value (for example, +1 or −1) other than 0 when the frequency error of a carrier is large. When the value of the integrator 48 of the loop filter 103 reaches the positive maximum value Lim_max, the limiter 104 sets the negative minimum value Lim_min in the integrator 48. When the value of the integrator 48 reaches the negative minimum value Lim_min, the limiter 104 sets the positive maximum value Lim_max in the integrator 48. Thus, although the frequency error of a carrier is large, the output of the loop filter 103 can be changed in a broad range from the negative minimum value to the positive maximum value, thereby setting a broad capture range. Furthermore, by setting a broad capture range, the capture time required when a phase error is large can be shortened.

Figure 14:
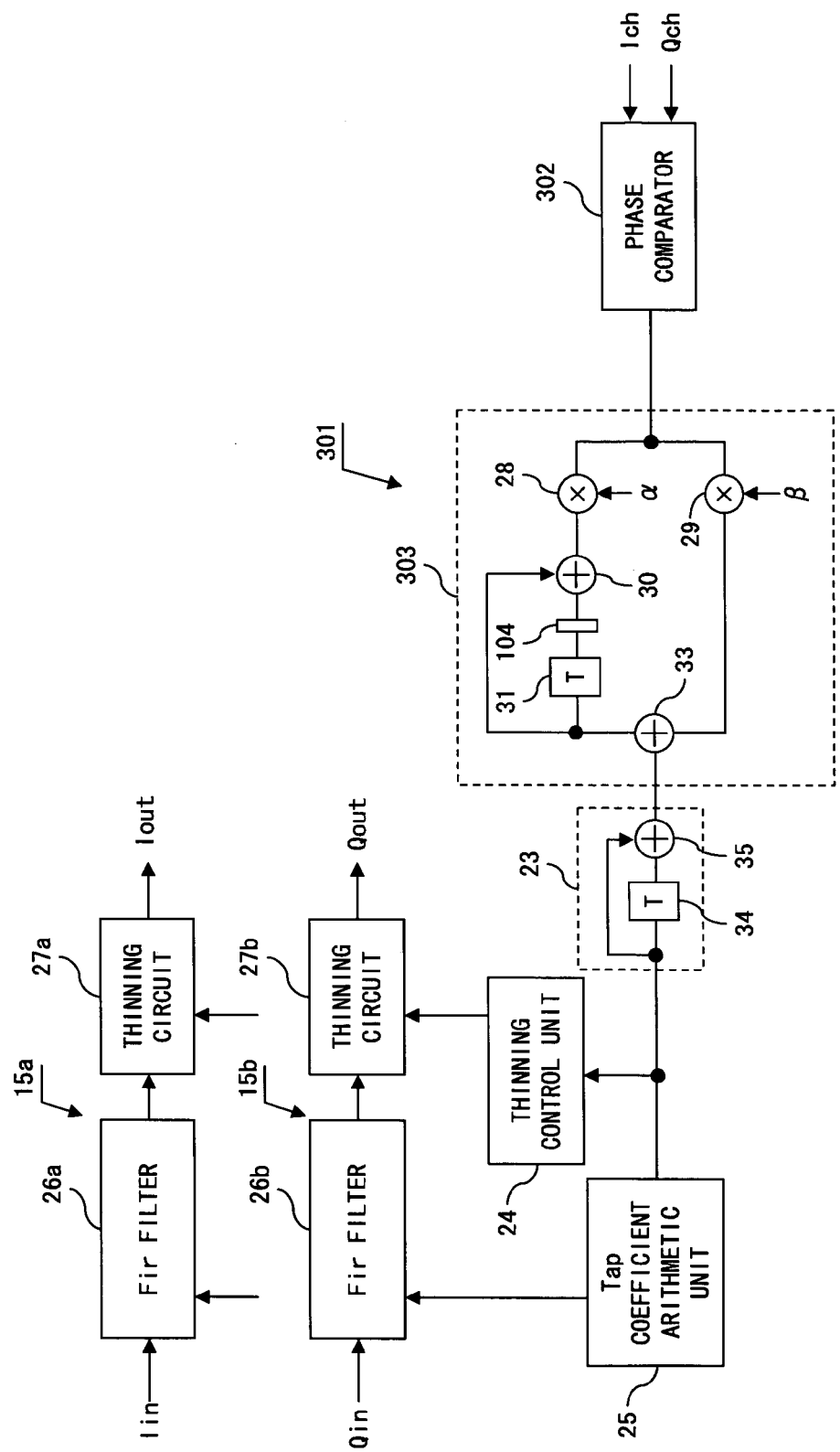
FIG. 14 shows the configuration of the timing recovery loop according to the second embodiment of the present invention.

FIG. 14 shows the configuration of the timing recovery loop (corresponding to the clock regeneration loop) according to the second embodiment of the present invention. In FIG. 14, the same block as the timing recovery loop shown in FIG. 2 is assigned the same reference numeral, and the detailed explanation is omitted here.

Figure 2:
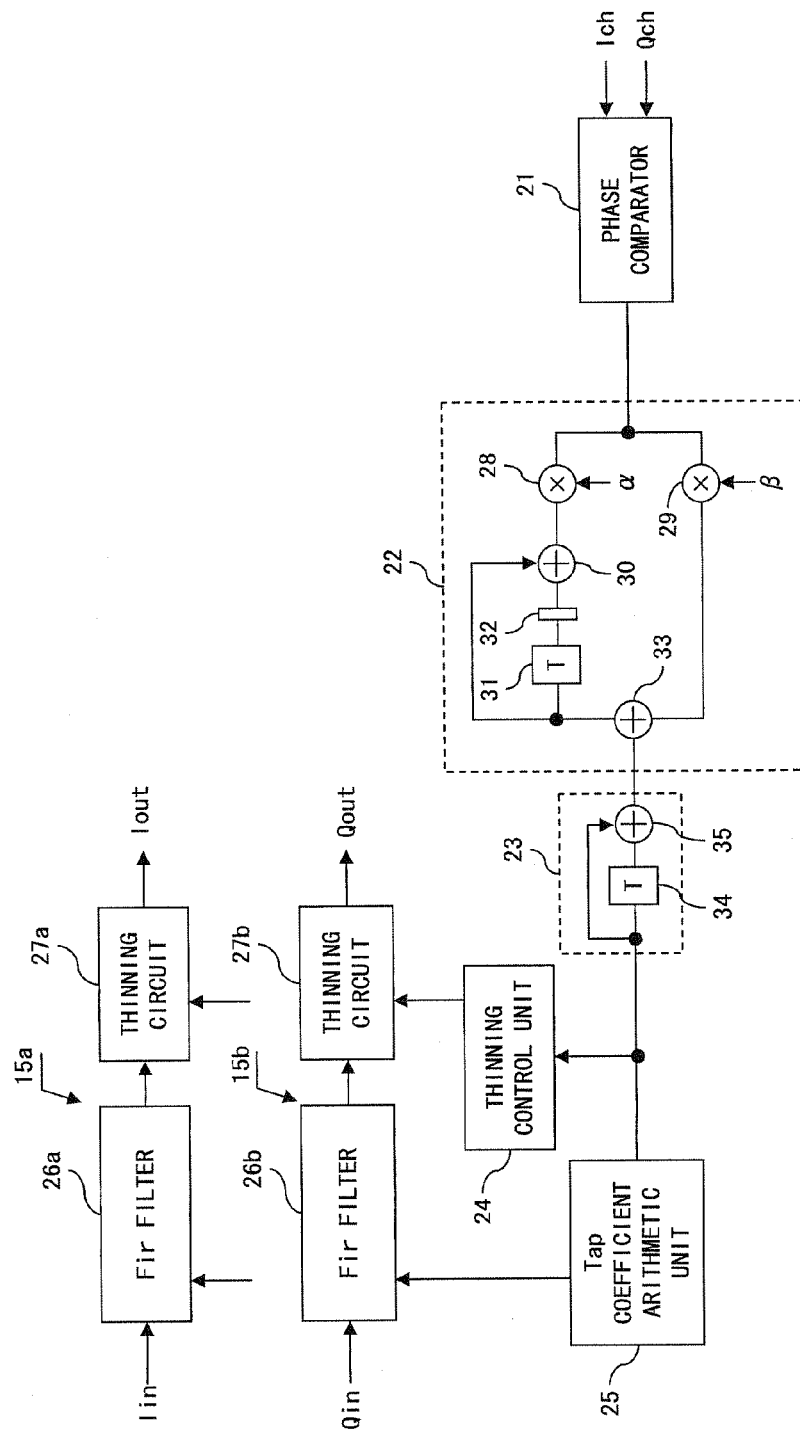
FIG. 2 shows the configuration of a timing recovery loop.
Figure 3A:
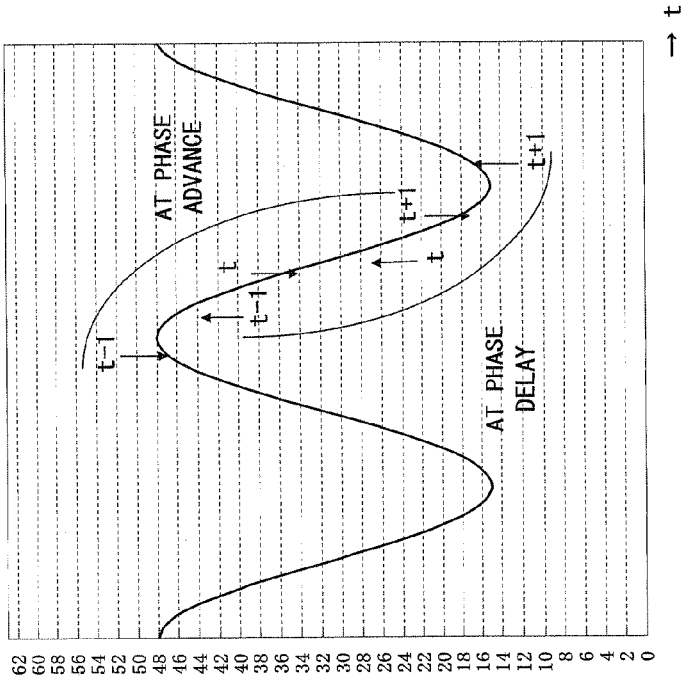
FIGS. 3A and 3B are explanatory views of the operation of the phase comparator.
Figure 3B:
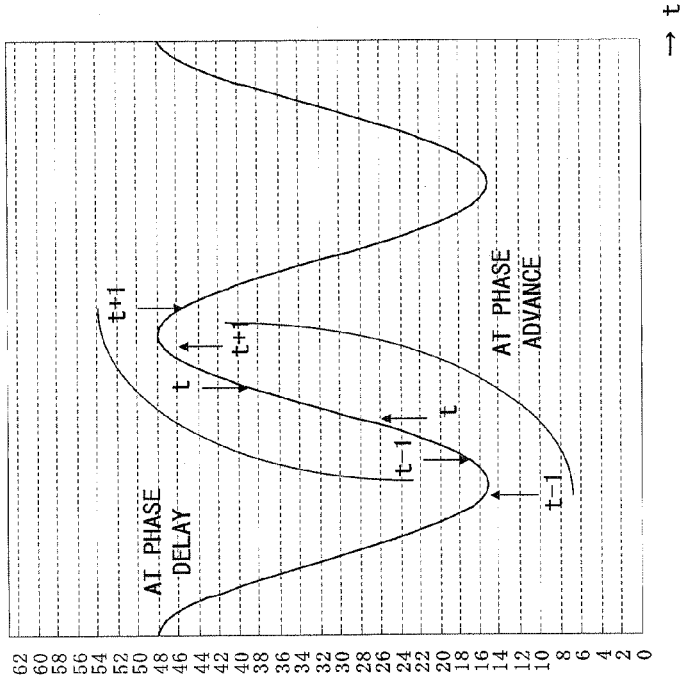
Figure 5:
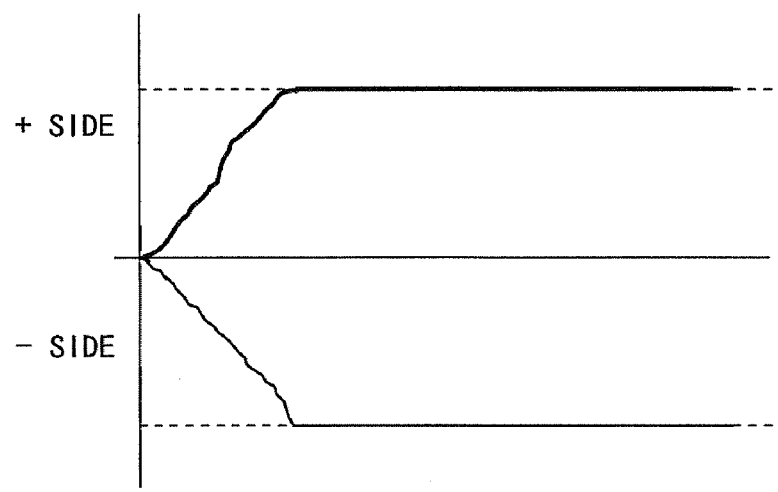
FIG. 5 shows the value of a limiter.

The differences between FIG. 14 and FIG. 2 are the configurations of a phase comparator 302 and a loop filter 303 of a timing recovery circuit 301.

Figure 15:
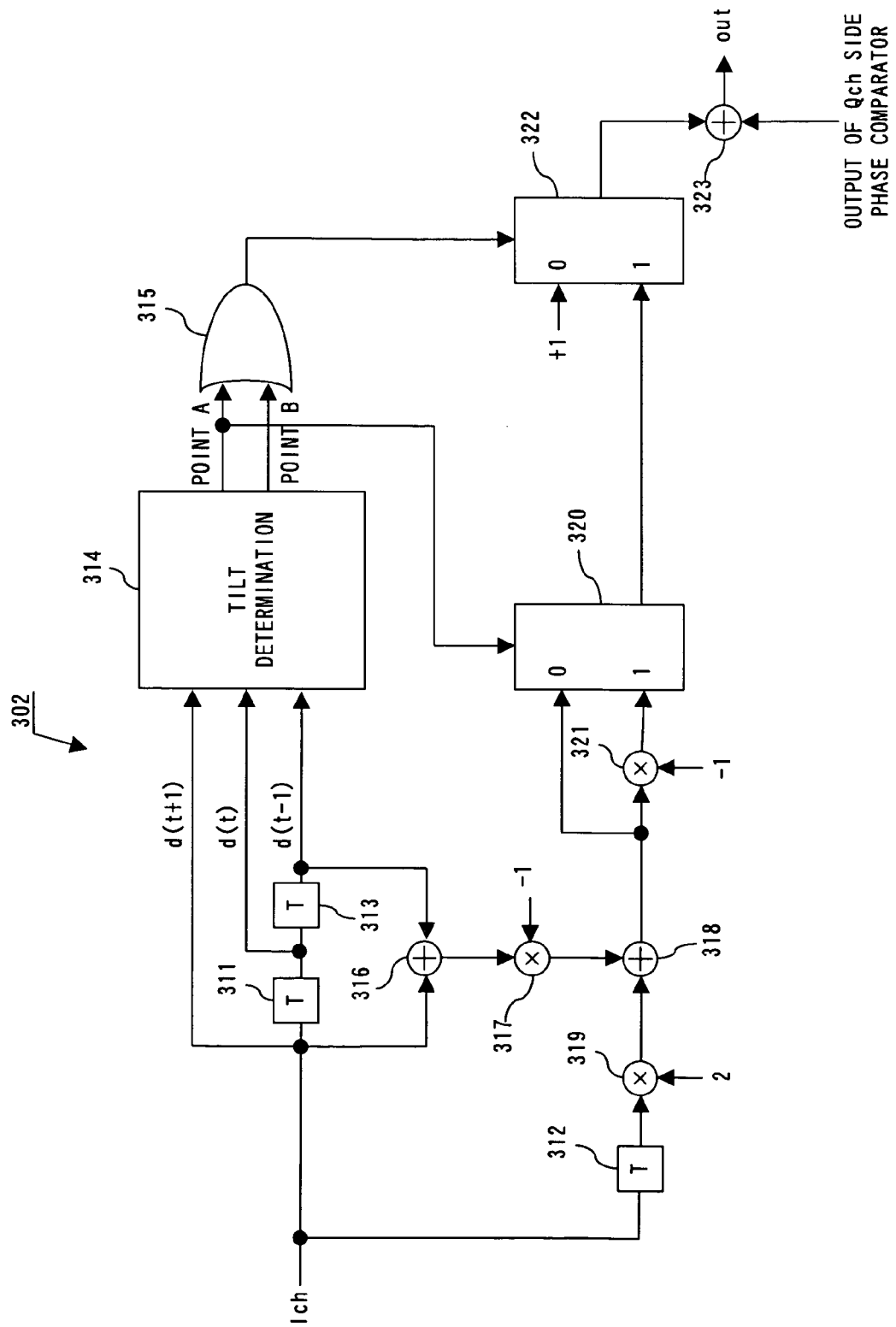
FIG. 15 shows the configuration of the phase comparator according to the second embodiment of the present invention.

FIG. 15 shows the configuration of the phase comparator 302 according to the second embodiment of the present invention. FIG. 14 shows the phase comparator 302 for an I signal only, but the timing recovery circuit 301 also comprises a phase comparator for a Q signal having a similar configuration.

Flip-flops 311 and 312 latch an I signal with the timing synchronous with the sampling clock, and a flip-flop 313 latches the output of the flip-flop 311 with the timing synchronous with the sampling clock.

If the value of the I signal at the time t−1 is d(t−1), the value of the I signal at the time t is d(t), and the value of the I signal at the time t+1 is d(t+1), then a tilt determination circuit 314 receives d(t+1), the output d(t) of the flip-flop 311, and the output d(t−1) of the flip-flop 313. The tilt determination circuit 314 compares the value of d(t+1), d(t), and d(t−1), and determines whether the value of the I signal indicates a monotonous increase or a monotonous decrease. Practically, when d(t−1)<d(t)<d(t+1), it is determined as a monotonous increase, and when d(t−1)>d(t)>d(t+1), it is determined as a monotonous decrease. The tilt determination circuit 314 outputs "1" at the point A when the value of the I signal indicates a monotonous increase, and otherwise outputs "0" to the point A. When the value of the I signal indicates a monotonous decrease, it outputs "1" to the point B, and otherwise outputs "0" to the point B. The values at the points A and B are also input to an OR gate 315. The OR gate 315 outputs "0" to the control terminal of the selector 322 only when the I signal does not indicate a monotonous increase or a monotonous decrease, and otherwise outputs "1".

An adder 316 sums the value d(t+1) of the I signal at the time t+1, and the value d(t−1) of the I signal at the time t−1. A multiplier 317 multiplies the sum of the output d(t+1) of the adder 316 and d(t−1) by "−1", and outputs the product to an adder 318.

A multiplier 319 multiplies the value d(t) at the time t as the output of the flip-flop 312 by "2". The adder 318 sums the −{d(t+1)+d(t−1)} output from the multiplier 317 and 2×d(t) output from the multiplier 319.

The output of the adder 318 is input to the input terminal "0" of a selector 320, and the value obtained by multiplying the output of the adder 318 by "−1" by a multiplier 321 is input to the input terminal "1" of the selector 320.

A signal at the point A of the tilt determination circuit 314 is input to the control terminal of the selector 320, and when the signal at the point A is "1", that is, a monotonous increase, the value obtained by multiplying the output of the adder 318 by "−1" is selected by the selector 320. When the signal at the point A is "0", that is, the signal does not indicate a monotonous increase, the output of the adder 318 is selected and output.

"+1" is input to one input terminal (input indicated by "0" shown in FIG. 15) of a selector 322, and the output of the selector 320 is input to the other input terminal (input indicated by "1" as shown in FIG. 15). When the output of the OR gate 315 is "0", that is, only when the I signal does not indicate a monotonous increase or a monotonous decrease, the selector 322 selects "1" and outputs it. Otherwise, it outputs the values output from the selector 320, that is, 2×d(t)−{d(t+1)+d(t−1)} or −1×{2×d(t)−{d(t+1)+d(t−1)}}.

An adder 323 sums the outputs of the selector 322 and the phase comparator (phase comparator having the configuration similar to that of the phase comparator 302 shown in FIG. 15) on the Q channel side, and outputs the sum.

The limiter 104 of the timing recovery circuit 301 according to the second embodiment has the same configuration as the limiter 104 shown in FIG. 10.

In the timing recovery circuit 301 according to the second embodiment of the present invention, only when the I signal or the Q signal does not indicate a monotonous increase or a monotonous decrease, the phase comparator 302 outputs "1". Therefore, even when the phase error of a sampling clock relative to the symbol timing is large, the value of the integrator 31 of the loop filter 303 increases according to the phase error signal (for example, "1") output from the phase comparator 302, and the integrated value of the integrator 31 (having the same function as the integrator 48) and the limiter 104 reaches a positive maximum value. When the integrated value of the output of the phase comparator 302 reaches a positive maximum value, the negative minimum value is output as an integrated value from the limiter 104, and the negative minimum value is set in the integrator 31. Afterwards, until timing synchronization can be attained, the value of the integrator 31 increases from the negative minimum value to the positive maximum value each time "1" is output from the phase comparator 302. Thus, the synchronous capturing operation can be performed on a regeneration clock in a broad capture range from the negative minimum value to the positive maximum value when advance or delay of a phase is determined.

The operation of capturing a timing recovery loop is explained by referring to FIG. 13A. When the convergence point is located at the point b shown in FIG. 13A, the value of the integrator 31 gradually increases by the value of "1" output from the phase comparator 302 in the asynchronous state. When the value of the integrator 31 reaches the positive maximum value, the limiter 104 sets the negative minimum value in the integrator 31. Afterwards, until synchronization can be attained, that is, until the I signal or the Q signal indicates a monotonous increase or a monotonous decrease, the phase comparator 302 outputs "1", and the value of the integrator 31 gradually increases. When the value of the integrator 31 reaches the value (indicated by the black dot shown in FIG. 13A) of the convergence point b, the capturing operation terminates. In the case above, the synchronous capture range spans the negative minimum value through the positive maximum value. Therefore, the capture range is broad.

In the second embodiment of the present invention, when the I signal or the Q signal does not indicate a monotonous increase or a monotonous decrease, it is determined that the phase advance or delay by the symbol timing cannot be discriminated, the phase comparator 302 outputs a predetermined value (for example, +1 or −1), and the value of the integrator 31 of the loop filter 303 is increased or decreased. When the integrated value of the limiter 104 reaches the maximum value, the negative minimum value is set in the integrator 31. Otherwise, when the integrated value of the limiter 104 reaches the negative minimum value, the positive maximum value is set in the integrator 31. With the above-mentioned configuration, the capture range can be expanded by changing the output of the loop filter 303 in the range from the negative minimum value to the positive maximum value although the phase error of the clock for the symbol timing is large. Additionally, the capture time can also be shortened by expanding the capture range although the phase error of the clock is large.

According to the above-mentioned first and second embodiments, the regenerated carrier wave of a carrier recovery loop can be traced (or synchronized) by a carrier wave of a received signal, or the sampling clock of a clock regeneration loop can be traced (or synchronized) by the symbol timing of a received signal.

According to the above-mentioned embodiment, the capture range of the carrier wave regeneration loop or a clock regeneration loop can be expanded, and the capture time can be shortened.

The present invention is not limited to the above-mentioned embodiments, and can be constituted, for example, as follows.

(1) The embodiments include the explanation of the QPSK demodulation circuit, but the present invention is not limited to the embodiments, and can be applied to the demodulation circuits in other multi-value modulation systems such as the QAM, etc.

(2) The present invention is not limited to the phase comparator, loop filters, etc. with the circuit configurations described in the embodiments, but can be applied to the phase comparators, loop filter, etc. with well-known other circuit configurations.

What is claimed is:

1. A demodulation circuit which demodulates a received signal, comprising:
   a carrier wave regeneration loop performing control such that a phase error for a carrier wave can be minimized in tracing the carrier wave;
   a phase error determination circuit which is included in the carrier wave regeneration loop, determines advance or delay of a phase relative to the carrier wave, determines as a phase advance when a phase advance or delay cannot be discriminated, and outputs a value of a determination result of the phase advance or delay; and
   a loop filter, which is included in the carrier wave regeneration loop, includes an integrating circuit which integrates the value of the determination result of the phase advance or delay outputted from the phase error determination circuit, and shifts the integrated value of the integrating circuit to a maximum integrated value on a phase-delay determined side when the integrated value reaches a maximum integrated value on a phase-advance determined side.

2. The circuit according to claim 1, wherein
   the loop filter includes a limiter for outputting the maximum integrated value on the phase-delay determined side as the integrated value when the integrated value of the determination result of the phase error determination circuit reaches the maximum integrated value on the phase-advance determined side.

3. The circuit according to claim 1, wherein
   the phase error determination circuit outputs a predetermined value other than 0 when a signal point on an I and Q phase plane of the carrier wave is on a predetermined line or in a predetermined area.

4. The circuit according to claim 1, wherein
   the phase error determination circuit outputs a predetermined value other than 0 when a signal point on an I and Q phase plane of the carrier wave is on a line of Q=1 or Q=−I.

5. A demodulation circuit which demodulates a received signal, comprising:
   a carrier wave regeneration loop performing control such that a phase error for a carrier wave can be minimized in tracing the carrier wave;
   a phase error determination circuit which is included in the carrier wave regeneration loop, determines advance or delay of a phase relative to the carrier wave, determines as a phase delay when a phase advance or delay cannot be discriminated, and outputs a value of a determination result of the phase advance or delay; and
   a loop filter, which is included in the carrier wave regeneration loop, includes an integrating circuit which integrates the value of the determination result of the phase advance or delay outputted from the phase error determination circuit, and shifts the integrated value to a maximum integrated value on a phase-advance determined side when the integrated value reaches a maximum integrated value on a phase-delay determined side.

6. The circuit according to claim 5, wherein
   the loop filter includes a limiter for outputting the maximum integrated value on the phase-advance determined side as the integrated value when the integrated value of the determination result of the phase error determination circuit reaches the maximum integrated value on the phase-delay determined side.

7. The circuit according to claim 5, wherein
   the phase error determination circuit outputs a predetermined value other than 0 when a signal point on an I and Q phase plane of the carrier wave is on a predetermined line or in a predetermined area.

8. A demodulation circuit which demodulates a received signal, comprising:
   a clock regeneration loop performing control such that a phase error for a symbol timing can be minimized in allowing a clock to trace the symbol timing of a received signal;
   a phase error determination circuit which is included in the clock regeneration loop, determines advance or delay of a phase relative to the symbol timing, determines as a phase advance when a phase advance or delay cannot be discriminated, and outputs a value of a determination result of the phase advance or delay; and
   a loop filter, which is included in the clock regeneration loop, includes an integrating circuit which integrates the value of the determination result of the phase advance or delay outputted from the phase error determination circuit, and shifts the integrated value to a maximum integrated value on a phase-delay determined side when the integrated value reaches a maximum integrated value on a phase-advance determined side.

9. The circuit according to claim 8, wherein
   the loop filter includes a limiter for outputting the maximum integrated value on the phase-delay determined side as the integrated value when the integrated value of the determination result of the phase error determination circuit reaches the maximum integrated value on the phase-advance determined side.

10. The circuit according to claim 8, wherein
    when the carrier wave is sampled using a predetermined sampling clock, the phase error determination circuit determines whether a value of each sampling point indicates a monotonous increase or a monotonous decrease, and outputs a predetermined value other than 0 when the value does not indicate a monotonous increase or a monotonous decrease.

11. A demodulation circuit which demodulates a received signal, comprising:
    a clock regeneration loop performing control such that a phase error for a symbol timing can be minimized in allowing a clock to trace the symbol timing of a received signal;
    a phase error determination circuit which is included in the clock regeneration loop, determines advance or delay of a phase relative to the symbol timing, determines as a phase delay when a phase advance or delay cannot be discriminated, and outputs a value of a determination result of the phase advance or delay; and
    a loop filter, which is included in the clock regeneration loop, includes an integrating circuit which integrates the value of the determination result of the phase advance or delay outputted from the phase error determination circuit, and shifts the integrated value to a maximum integrated value on a phase-advance determined side when the integrated value reaches a maximum integrated value on a phase-delay determined side.

12. The circuit according to claim 11, wherein
    the loop filter includes a limiter for outputting the maximum integrated value on the phase-advance determined side as the integrated value when the integrated value of the determination result of the phase error determination circuit reaches the maximum integrated value on the phase-delay determined side.

13. The circuit according to claim 11, wherein
when the carrier wave is sampled using a predetermined sampling clock, the phase error determination circuit determines whether a value of each sampling point indicates a monotonous increase or a monotonous decrease, and outputs a predetermined value other than 0 when the value does not indicate a monotonous increase or a monotonous decrease.

14. The circuit according to claim 13, wherein
the phase error determination circuit comprises: a tilt determination circuit for determining whether values of at least three sampling points indicate monotonous increase or monotonous decrease when the carrier wave is sampled at a predetermined sampling clock; and a selection circuit for outputting a predetermined value other than 0 when the tilt determination circuit determines that monotonous increase or monotonous decrease is not indicated, and outputting a value obtained from the values of the three sampling points as a determination result of a phase error when monotonous increase or monotonous decrease is determined.

15. A method for demodulating a received signal, comprising:
determining a phase advance or delay for a carrier wave, and determining as a phase advance when a phase advance or delay cannot be discriminated;
integrating a value of a determination result of a phase advance or delay by an integrating circuit, and shifting the integrated value to a maximum integrated value on a phase-delay determined side when the integrated value reaches a maximum integrated value on a phase-advance determined side; and
performing carrier wave regeneration control such that a phase error for the carrier wave can be minimized based on the integrated value.

16. The method according to claim 15, wherein
when the carrier wave is sampled using a predetermined sampling clock, it is determined whether a value of each sampling point indicates a monotonous increase or a monotonous decrease, and a predetermined value other than 0 is output when the value does not indicate a monotonous increase or a monotonous decrease.

17. A method for demodulating a received signal, comprising:
determining a phase advance or delay for a carrier wave, and determining as a phase delay when a phase advance or delay cannot be discriminated;
integrating a value of a determination result of a phase advance or delay by an integrating circuit, and shifting the integrated value to a maximum integrated value on a phase-advance determined side when the integrated value reaches a maximum integrated value on a phase-delay determined side; and
performing carrier wave regeneration control such that a phase error for the carrier wave can be minimized based on the integrated value.

* * * * *